United States Patent [19]

Diana

[11] 3,723,421

[45] Mar. 27, 1973

[54] 3-(SUBSTITUTED AMINO)-1H-ISOINDOLES

[75] Inventor: Guy D. Diana, Stephentown, N.Y.

[73] Assignee: Sterling Drug Inc., New York, N.Y.

[22] Filed: Aug. 10, 1970

[21] Appl. No.: 62,701

[52] U.S. Cl. ........... 260/240 F, 424/274, 260/240 G, 260/325, 260/326.1, 260/566 A

[51] Int. Cl. ............................................. C07d 27/48

[58] Field of Search ....................... 260/240 F, 326.1

[56] References Cited

OTHER PUBLICATIONS

Sieveking et al., Angew. Chem. Int. Ed. Engl. 1969, Vol. 8, pages 457–458 (published June 1969).

Bartlett et al., J. Chem. Soc., Section C., Organic, 1969, pages 129 to 133.

*Primary Examiner*—John D. Randolph
*Attorney*—Elmer J. Lawson, B. Woodrow Wyatt, Thomas L. Johnson, Robert K. Bair, William G. Webb and Frederik W. Stonner

[57] ABSTRACT

3-(Substituted or unsubstituted amino)-1H-isoindoles, prepared by condensing 3-alkoxy-1H-isoindoles or 3-(chloro or bromo)-1H-isoindoles with amine derivatives and optionally acylating the resulting 3-(primary or secondary amino)-1H-isoindoles or condensing the resulting 3-hydrazino-1H-isoindoles with an aldehyde or a ketone, are useful as antibacterial agents and as antihypertensive agents.

20 Claims, No Drawings

3-(SUBSTITUTED AMINO)-1H-ISOINDOLES

NEW COMPOSITIONS OF MATTER AND PROCESSES

This invention relates to new and useful compositions of matter classified in the art of chemistry as isoindoles and to processes for their preparation.

In its composition of matter aspect my invention provides 1-(X)-1-(X')-3-(Y)-5-(Z)-6-(Z')-1H-isoindole of the formula

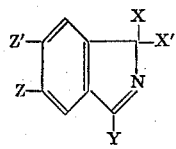

(Formula I)

wherein
X, when taken alone, is hydrogen, atertiary alkyl of one to four carbon atoms, phenyl, or phenylalkyl of seven to ten carbon atoms;
X', when taken alone, is hydrogen;
X and X', when taken together, are benzylidene, α-chlorobenzyl-idene, or α-bromobenzylidene;
Y is NQQ' or NHN=CRR';
wherein
Q, when taken alone, is hydrogen; alkyl of one to six carbon atoms; phenylalkyl of seven to ten carbon atoms; $(CH_2)_n$-T, wherein n is two or three and T is dialkylamino, wherein alkyl of dialkylamino is atertiary alkyl of one to four carbon atoms; alkanoyl of one to six carbon atoms; benzoyl; phenylalkanoyl of eight to eleven carbon atoms; amino or hydroxy;
Q', when taken alone, is hydrogen or atertiary alkyl of one to four carbon atoms;
Q and Q', when taken together with N, are 1-azacycloalkyl of five to seven ring atoms and four to ten carbon atoms;
R, when taken alone, is hydrogen, alkyl of one to six carbon atoms, alkenyl of two to six carbon atoms, cycloalkyl of three to seven ring atoms and three to ten carbon atoms, cycloalkenyl of five to seven ring atoms and five to ten carbon atoms, phenyl, phenylalkyl of seven to ten carbon atoms or phenylalkenyl of eight to ten carbon atoms;
R', when taken alone, is hydrogen or atertiary alkyl of one to four carbon atoms;
R and R', when together with C, are cycloalkylidene of five to seven ring atoms and five to ten carbon atoms;
Z and Z', when taken alone, are the same or different and are hydrogen, atertiary alkyl of one to four carbon atoms, halo, hydroxy or atertiary alkoxy of one to four carbon atoms;
Z and Z', when taken together, are methylenedioxy;
and wherein, when X and X', when taken together, are benzylidene,
α-chlorobenzylidene, or α-bromobenzylidene; when Q is phenylalkyl of seven to ten carbon atoms or benzoyl and when R is phenyl; the benzene ring thereof can be substituted by one to three members selected from the group consisting of halo, hydroxy, atertiary alkyl of one to four carbon atoms, atertiary alkoxy of one to four carbon atoms and phenylalkoxy of seven to ten carbon atoms or by a member selected from the group consisting of atertiary alkylthio of one to four carbon atoms, dialkylamino and β-dialkylaminoethoxy, wherein alkyl of dialkylamino is atertiary alkyl of one to four carbon atoms, nitro and sulfamoyl;
and acid addition salts thereof.

The isoindoles of Formula I and acid addition salts thereof have antibacterial activity and antihypertensive activity and are useful as antibacterial agents and as antihypertensive agents.

In one of its process aspects my invention provides the process for producing 1-(X'')-1-(X')-3-(NQ'Q'')-5-(Z)-6-(Z')-1H-isoindole of the formula

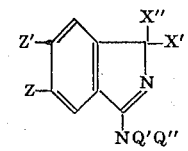

(Formula II)

wherein
X'', when taken alone, is hydrogen, atertiary alkyl of one to four carbon atoms, phenyl, or phenylalkyl of seven to ten carbon atoms;
X', when taken alone, is hydrogen as recited above for Formula I;
X'' and X', when taken together, are benzylidene or benzylidene substituted in the benzene ring as recited above for Formula I;
Q', when taken alone, is hydrogen or atertiary alkyl of one to four carbon atoms as recited above for Formula I;
Q'', when taken alone, is hydrogen; alkyl of one to six carbon atoms; phenylalkyl of seven to ten carbon atoms; $(CH_2)_n$-T, wherein n is two or three and T is dialkylamino, wherein alkyl of dialkylamino is atertiary alkyl of one to four carbon atoms; amino or hydroxy;
Q' and Q'', when taken together with N, are 1-azacycloalkyl of five to seven ring atoms and four to ten carbon atoms;
Z and Z' are defined as recited above for Formula I;
which comprises the step of condensing 1-(X'')-1-(X')-3-(OQ''')-5-(Z)-6-(Z')-1H-isoindole of the formula

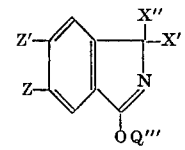

(Formula III)

wherein
Q''' is methyl, ethyl or propyl, with an amine, a hydrazine or a hydroxylamine of the formula HNQ'Q''.

In another of its process aspects my invention provides the process for producing 1-(X''',X''''-methylene)-3-(NQ'Q'')-5-(Z)-6-(Z')-1H-isoindole of the formula

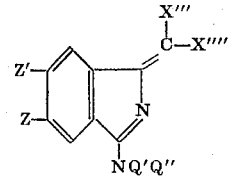

(Formula IV)

wherein
X''' is phenyl or phenyl substituted as recited above for Formula I;
X'''' is chloro or bromo;
Q' and Q'' are defined as recited above for Formula II; and Z and Z' are defined as recited above for Formula I; which comprises the steps of chlorinating or brominating 3-(X'''-methylene)-5-(Z')-6-(Z)-phthalimidine of the formula

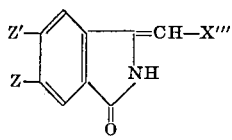

(Formula V)

and condensing the resulting 1-(X''',X''''-methylene)-3-(X'''')-5-(Z)-6-(Z')-1H-isoindole of the formula

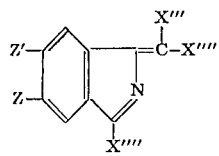

(Formula VI)

with an amine, a hydrazine or a hydroxylamine of the formula HNQ'Q''.

In still another of its process aspects my invention provides the process for producing 1-(X)-1-(X')-3-(NQ'Q'''')-5-(Z)-6-(Z')-1H-isoindole of the formula

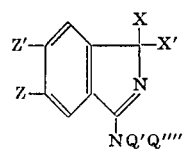

(Formula VII)

wherein X and X' are defined as recited above for Formula I;
Q' is hydrogen or atertiary alkyl of one to four carbon atoms as recited above for Formula I;
Q'''' is alkanoyl of one to six carbon atoms, benzoyl, phenyl-alkanoyl of eight to eleven carbon atoms or benzoyl substituted in the benzene ring as recited above for Formula I; and
Z and Z' are defined as recited above for Formula I; which comprises the step of acylating 1-(X)-1-(X')-3-(NHQ')-5-(Z)-6-(Z')-1H-isoindole of the formula

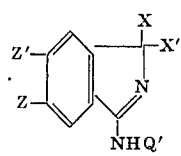

Formula (VIII)

with an acyl chloride of the formula Q''''Cl, an acyl bromide of the formula Q''''Br or an acid anhydride of the formula (Q'''')$_2$O.

In yet another of its process aspects my invention provides the process for producing 1-(X)-1-(X')-3-(NHN=CRR')-5-(Z)-6-(Z')-1H-isoindole of the formula

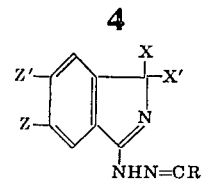

(Formula IX)

wherein X, X', R, R', -Z and Z' are defined as recited above for Formula I, which comprises the step of condensing 1-(X)-1-(X')-5-(Z)-6-(Z')-3-hydrazino-1H-isoindole of the formula

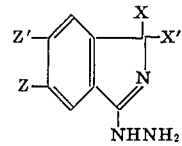

(Formula X)

with an aldehyde or ketone of the formula O=CRR'.

Throughout this specification a symbol used in one formula has the same meaning when used in any other formula.

In the definitions of the formulas above atertiary alkyl of one to four carbon atoms is methyl, ethyl, propyl, isopropyl, butyl, isobutyl or sec-butyl. Atertiary alkoxy of one to four carbon atoms is methoxy, ethoxy, propoxy, isopropoxy, butoxy, isobutoxy, or sec-butoxy. Atertiary alkylthio of one to four carbon atoms is methylthio, ethylthio, propylthio, isopropylthio, butylthio, isobutylthio or sec-butylthio.

When X, Q, Q'' or R is phenylalkyl of seven to ten carbon atoms, phenylalkyl is, for example, benzyl, 1-phenylethyl, 3-phenylpropyl or 1-methyl-1-phenylethyl.

When Q, Q'' or R is alkyl of one to six carbon atoms, alkyl can be branched or unbranched alkyl, as illustrated by methyl, ethyl, propyl, isopropyl, butyl, isobutyl, sec-butyl, tert-butyl, pentyl and hexyl.

When Q or Q'''' is alkanoyl of one to six carbon atoms, alkanoyl is, for example, formyl, acetyl, propionyl, butyryl, isobutyryl, valeryl, pivalyl or caproyl.

When Q or Q'''' is phenylalkanoyl of eight to eleven carbon atoms, phenylalkanoyl is, for example, phenylacetyl, β-phenylpropionyl or β-phenylbutyryl.

When Q and Q', taken together with N, are 1-azacyclo-alkyl of five to seven ring atoms and four to ten carbon atoms, 1-azacycloalkyl can be branched or unbranched 1-azacycloalkyl, as illustrated by 1-pyrrolidinyl, piperidino, 4-methyl-1-piperidinyl and 1-hexahydroazepinyl.

When R is alkenyl of two to six carbon atoms, alkenyl can be branched or unbranched alkenyl, as illustrated by vinyl, allyl, 1-methyl-1-propenyl and 2-hexenyl.

When R is cycloalkyl of three to seven ring atoms and three to ten carbon atoms, cycloalkyl can be branched or unbranched cycloalkyl, as illustrated by cyclopropyl, cyclobutyl, cyclopentyl, cyclohexyl, 4-methylcyclohexyl and cycloheptyl.

When R is cycloalkenyl of five to seven ring atoms and five to ten carbon atoms, cycloalkenyl can be branched or unbranched cycloalkenyl, as illustrated by 1-cyclopentenyl, 3-cyclohexenyl, 4-methyl-3-cyclohexenyl and 1-cycloheptenyl.

When R is phenylalkenyl of eight to ten carbon atoms, phenylalkenyl is, for example, styryl, α-methylstyryl or β-methylstyryl.

When R and R', taken together with C, are cycloalkylidene of five to seven ring atoms and five to ten carbon atoms, cycloalkylidene can be branched or unbranched cycloalkylidene, as illustrated by cyclopentylidene, cyclohexylidene, 4-methylcyclohexylidene and cycloheptylidene.

As benzene ring substituents halo is fluoro, chloro, bromo or iodo and phenylalkoxy is illustrated by benzyloxy, β-phenylethoxy and β-phenylpropoxy.

The manner and process of making and using the invention and the best mode of carrying it out will now be described so as to enable any person skilled in the art to which it pertains to make and use it.

Condensation of 1-(X'')-1-(X')-3-(OQ''')-5-(Z)-6-(Z')-1H-isoindole of Formula III with an amine, a hydrazine or a hydroxylamine of the formula HNQ'Q'' or an acid addition salt thereof is performed with or without a diluent at a temperature in the range of 0°–150C. If a diluent is used, it can be any solvent inert under the reaction conditions, for example, methanol, ethanol, 2-propanol, acetonitrile, dimethylsulfoxide, N,N-dimethylformamide or mixtures thereof.

Chlorination or bromination of 1-(X'''-methylene)-5-(Z)-6-(Z')-phthalimidine of Formula V is accomplished using a chlorinating or brominating agent, preferably thionyl chloride or thionyl bromide, with or without a diluent at a temperature in the range of 0°–150C. If a diluent is used, it can be any solvent inert under the reaction conditions, for example, chloroform, benzene or chlorobenzene.

Condensation of 1-(X''', X''''-methylene)-3-(X'''')-5-(Z)-6-(Z')-1H-isoindole of Formula VI with an amine, a hydrazine or a hydroxylamine of the formula HNQ'Q'' is carried out using a solvent inert under the reaction conditions at a temperature in the range of 0°–150C. Ether is the preferred solvent, although tetrahydrofuran, chloroform, benzene or dioxane or mixtures thereof can also be used.

Acylation of 1-(X)-1-(X')-3-(NHQ')-5-(Z)-6-(Z')-1H-isoindole of Formula VIII with an acyl chloride of the formula Q''''Cl, an acyl bromide of the formula Q''''Br or an acid anhydride of the formula (Q'''')$_2$O is done using a solvent inert under the reaction conditions, for example, tetrahydrofuran, chloroform, benzene, dioxane, pyridine, N,N-dimethylformamide or mixtures thereof and an acid acceptor, for example, triethylamine or pyridine, at a temperature in the range of 0°–150°C.

Condensation of 1-(X)-1-(X')-5-(Z)-6-(Z')-3-hydrazino-1H-isoindole of Formula X with an aldehyde or a ketone of the formula O=CRR' is effected with or without a diluent at a temperature in the range of 0°–150C. If a diluent is used it can be any solvent inert under the reaction conditions, for example, methanol, ethanol, ether, benzene, tetrahydrofuran or mixtures thereof.

Acid addition salts of the isoindoles of Formula I of my invention can be prepared with any pharmaceutically acceptable inorganic (mineral) or organic acid. If inorganic, the acid can be, for example, hydrochloric acid, hydrobromic acid, nitric acid, phosphoric acid, sulfuric acid, or sulfamic acid. If organic, the acid can be, for example, acetic acid, glycolic acid, lactic acid, quinic acid, hydrocinnamic acid, succinic acid, tartaric acid, citric acid, methanesulfonic acid, benzenesulfonic acid, cyclohexanesulfamic acid or picric acid.

For the pharmaceutical purposes of this invention the free base forms of the isoindoles of Formula I and their corresponding acid addition salts are considered to be equivalent. That the protonic acid be pharmaceutically acceptable means that the beneficial properties inherent in the free base not be vitiated by side effects ascribable to the anions.

Although pharmaceutically acceptable salts are preferred, all acid addition salts are within the scope of the invention. A pharmaceutically unacceptable salt may be useful, for example, for purposes of identification or purification or in preparing a pharmaceutically acceptable salt by ion exchange procedures.

When crystalline, the isoindoles of Formulas I–X and their acid addition salts are purified by recrystallization and are characterized by their melting points (m.p.). When liquid, the isoindoles of Formulas I–XI are purified by distillation under reduced pressure and are characterized by their boiling points (b.p./mm.Hg.). The structures of the isoindoles of Formula I follow from the route of synthesis and are corroborated by infrared spectral analysis, by nuclear magnetic resonance spectral analysis and by the correspondence of calculated and found values of elemental analysis of representative samples.

As stated above the isoindoles of Formula I have antibacterial activity. This activity was measured by two test methods.

The first method is the spot plate test, which involves placing a few crystals of the compound to be tested on a seeded agar plate, incubating the plate and examining the plate for zones of inhibition of bacterial growth. A compound producing a zone of inhibition is recorded as active and a compound producing no zone of inhibition as inactive.

The second method is the broth dilution test by the Autotiter method. To the first cup of the Autotray is added an aliquot (0.08 ml.) of an aqueous solution (1,000 mcg./ml.) of the compound to be tested. Activation of the Autotiter initiates a sequence of operations in which an aliquot (0.05 ml.) of the solution in the first cup is withdrawn by a Microtiter transfer loop and diluted in sterile tryptose phosphate broth (0.05 ml.) in the second cup. Inoculated tryptose phosphate broth (0.05 ml.) containing triphenyltetrazolium chloride (50 mcg./ml.) as an indicator is then automatically added. After the initial dilution, the dilutions continue in two-fold decrements (from 250 to 0.06 mcg./ml.). The Autotray is incubated (18–20 hr. at 37°C.) and the minimum inhibitory concentration determined as the concentration which inhibits formation of a red precipitate of the indicator. The isoindoles of Formula I had minimum inhibitory concentrations in the range of 15–250 micrograms per milliliter in this test.

In a modification of the foregoing broth dilution test the initial aliquot is different (0.1 mcg./ml. instead of 0.08 mcg./ml.), the broth contains glucose instead of tryptose phosphate, no indicator is used, the dilution range is different (from 500 to 0.06 mcg./ml. instead of 250 to 0.06 mcg./ml.) and inhibition is judged by turbidity instead of by the appearance of a red precipitate.

The organisms used in the two broth dilution tests were *Staphylococcus aureus*, *Pseudomonas aeruginosa*, *Escherichia coli* and *Proteus vulgaris*.

As stated above the isoindoles of Formula I also have antihypertensive activity, which was determined in unanesthetized renal hypertensive rats using the photoelectric tensometer foot method described by Kersten, Brosene, Ablondi and SubbaRow, Journal of Laboratory and Clinical Medicine 32, 1090 (1947). In this test the compound to be tested is administered orally, preferably in the form of a pharmaceutically acceptable acid addition salt, as a solution or suspension in distilled water, by stomach tube with the aid of 1 percent gum tragacanth or subcutaneously to groups of three renal hypertensive rats at each of four different dose levels graduated at 0.3 to 0.9 logarithmic intervals. The systolic blood pressure is determined for each of the three rats at each dose level before medication and at intervals of 1, 2, 4, 5, 24 and 48 hours after medication. The unmedicated rats are considered hypertensive if the systolic blood pressure is 160 millimeters of mercury or greater. The medicated rats are considered normotensive if the systolic blood pressure is 130 millimeters of mercury or less. Each blood pressure reading is judged by these criteria. The dose level of test compound which reduces the systolic blood pressure to a normotensive level in 50 percent of the animals is defined as the $AED_{50}$ (approximate effective dose) value. When tested in this way, the isoindoles of Formula I were found to have $AED_{50}$ values in the range of 5–50 milligrams per kilogram.

The preparation of the intermediates of Formulas III and V will now be described.

Alkylation of 3-(X'')-3-(X')-5-(Z')-6-(Z)-phthalimidine of the formula

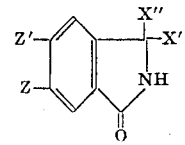

(Formula XI)

with a $(Q''')_3O^+$ (trialkyloxonium) salt provides 1-(X'')-1-(X')-3-(OQ''')-5-(Z)-6-(Z')-1H-isoindole of Formula III. The preferred trialkyloxonium salt is triethyloxonium fluoborate $[(C_2H_5)_3O^+BF_4^-]$.

Those phthalimidines of Formula XI in which X'' and X' are hydrogen are prepared, for example, by zinc and acetic acid reduction of the corresponding phthalimides.

Those phthalimidines of Formula XI in which X'' is alkyl, phenyl or phenylalkyl are prepared, for example, from the corresponding 3-(Z')-4-(Z)-phenyl-(X'')-ketoximes of the formula

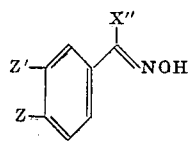

(Formula XII)

by treatment with carbon monoxide and hydrogen under pressure and catalysis by cobalt octacarbonyl. Those phthalimidines of Formula XI in which X'' is benzyl are also prepared by catalytic hydrogenation of the corresponding phthalimidines of Formula XI in which X'' and X', taken together, are benzylidene.

Those phthalimidines of Formula XI in which X'' and X', taken together, are benzylidene or benzylidene substituted in the benzene ring are the phthalimidines defined by Formula V and are prepared, for example, by condensing the corresponding phthalic anhydrides with the corresponding α-(X''')-acetic acids under sodium acetate catalysis and treating the resulting 3-(X'''-methylene)-5-(Z')-6-(Z)-phthalides successively with sodium hydroxide, hydrochloric acid and ammonia.

The following examples illustrate specific embodiments of my invention without limiting the latter thereto.

EXAMPLE 1

A mixture of 3-ethoxy-1H-isoindole (III: X''=X'=Z=Z'=H, Q'''=$C_2H_5$) fluoborate (17.5 g.), β-(dimethylamino)ethylamine (25 ml.) and methylene dichloride was stirred at room temperature (for 3 da.), allowed to stand in the refrigerator (for 1 wk.), basified with cooling with potassium carbonate solution (50%, 30 ml.), dried over magnesium sulfate and filtered. The filtrate was concentrated. A mixture of the resulting oil and ether (300 ml.) was acidified with ethereal hydrochloric acid. Two recrystallizations of the resulting solid from isopropyl alcohol afforded 3-{[2-(dimethylamino)ethyl]amino}-1H-isoindole (I: X=X'=Z=Z'=NQQ', Q=$CH_2CH_2N(CH_3)_2$, Q'=H) dihydrochloride (4.5 g., m.p. 258°–260°C. with decomposition.

EXAMPLE 2

Condensation of 1-methyl-3-ethoxy-1H-isoindole (III: X''=$CH_3$, X'=Z=Z'=H, Q'''=$C_2H_5$) and β-(dimethylamino)ethyl-amine affords 1-methyl-3-{[2-(dimethylamino)ethyl]amino}-1H-isoindole (I: X=$CH_3$, X'=Z=Z'=H, Y=NQQ', Q=$CH_2CH_2N(CH_3)_2$, Q'=H).

EXAMPLE 3

Condensation of 1-ethyl-3-ethoxy-1H-isoindole (III: X''=Q'''=$C_2H_5$, X'=Z=Z'=H) and β(dimethylamino)ethylamine affords 1-ethyl-3-{[2-(dimethylamino)ethyl]amino}-1H-isoindole (I: X=$C_2H_{bt}$, X'=Z=Z'=H, Y=NQQ', Q=$CH_2CH_2N(CH_3)_2$, Q'=H).

EXAMPLE 4

Condensation of 1-isopropyl-3-ethoxy-1H-isoindole (III: X''=$CH(CH_3)_2$, X'=Z=Z'=H, Q'''=$C_2H_5$) and β-(dimethylamino)-ethylamine affords 1-isopropyl-3-{[2-(dimethylamino)ethyl]amino}-1H-isoindole (I: X=$CH(CH_3)_2$, X'=Z=Z'=H, Y=NQQ', Q=$CH_2CH_2N(CH_3)_2$, Q'=H).

EXAMPLE 5

Condensation of 1-butyl-3-ethoxy-1H-isoindole (III: X''=$(CH_2)_3CH_3$, X'=Z=Z'=H, Q'''=$C_2H_5$) and β-(dimethylamino)-ethylamine affords 1-butyl-3-{[2-(dimethylamino)ethyl]amino}-1H-isoindole (I: X=$(CH_2)_3CH_3$, X'=Z=Z'=H, Y=NQQ', Q=$CH_2CH_2N(CH_3)_2$, Q'=H).

EXAMPLE 6

A mixture of 1-phenyl-3-ethoxy-1H-isoindole (III: X''=$C_6H_5$, X'=Z=Z'=H, Q'''=$C_2H_5$) (14 g., m.p. 118°–120°C.) and β-(dimethylamino)ethylamine (20 ml.) was heated under reflux (for 12 hr.). Part (11.5 g.) of the crystalline solid (14.3 g.) which separated after cooling the mixture was dissolved in absolute ethanol (140 ml.) and treated with a solution of cyclohexanesulfamic acid (23.2 g.) in absolute ethanol (90 ml.). The resulting solid was recrystallized from isopropyl alcohol-ether, affording 1-phenyl-3-{[2(dimethylamino)-ethyl]amino}-1H-isoindole (I: X=$C_6H_5$, X'=Z=Z'=H, Y=NQQ', Q=$CH_2CH_2N(CH_3)_2$, Q'=H) tris(cyclohexanesulfamate) (8.4 g., m.p. 152°–154°C.).

EXAMPLE 7

In a manner similar to that of Example 6, condensation of 1-benzyl-3-ethoxy-1H-isoindole (III: X''=$CH_2C_6H_5$, X'=Z=Z'=H, Q'''=$C_2H_5$) (17.3 g.) and β-(dimethylamino)ethylamine and treatment of an ethanol (300 ml.) solution of the resulting gum with picric acid (30 g.) afforded 1-benzyl-3-{[2-(dimethylamino)-ethyl]amino}-1H-isoindole (I: X=$CH_2C_6H_5$, N($CH_3$)$_2$, Q'=H)dipicrate (16.9 g., m.p. 196–197°C.).

Treatment of 1-benzyl-3-{[2-(dimethylamino)ethyl]amino}-1H-isoindole with cyclohexanesulfamic acid afforded 1-benzyl-3-{[2-(dimethylamino)ethyl]amino}-1H-isoindole tris(cyclohexone-sulfamate (m.p. 146°–148°C.).

EXAMPLE 8

Condensation of 1-(1-phenylethyl)-3-ethoxy-1H-isoindole (III: X''=$CH(CH_3)C_6H_5$, X'=Z=Z'=H, Q'''=$C_2H_5$) and β-(dimethyl-amino)ethylamine affords 1-(1-phenylethyl)-3-{[2-(dimethylamino)-ethyl]amino}-1H-isoindole (I: X=$CH(CH_3)C_6H_5$, X'=Z=Z'=H, Y=NQQ', Q=$CH_2CH_2N(CH_3)_2$, Q'=H).

EXAMPLE 9

In a manner similar to that of Example 1 condensation of 1-benzylidene-3-ethoxy-1H-isoindole (III: X''+X'=$CHC_6H_5$, Q=$C_2H_5$, Z=Z'=H) (24.9 g., m.p. 102°–105°C.) and β-(dimethylamino)ethyl-amine (40 ml.) and treatment of the resulting product with hydrochloric acid afforded 1-benzylidene-3-{[2-(dimethylamino)-ethyl]-amino}-1H-isoindole (I: X+X'=$C_6H_5$, Y=NQQ', Q=$CH_2CH_2N(CH_3)_2$, Q'=H, Z=Z'=H)dihydrochloride (16.0 g., m.p. 240°–241°C.).

EXAMPLE 10

A. A mixture of 2-benzylidenephthalimidine (V: X'''=$C_6H_5$, Z=Z'=H) (72 g.) and thionyl chloride (300 ml.) was heated under reflux (for 2 da.), then stripped of excess thionyl chloride. The residue was digested with Skellysolve A (82.6 g., m.p. 122°–123°C.). Part (35 g.) of the digested residue was recrystallized from Skellysolve B and part (1 g.) of the recrystallizate was again recrystallized from Skellysolve B, affording 1-(α-chlorobenzylidene)-3-chloro-1H-isoindole (VI: X'''=$C_6H_5$, X''''=Cl, Z=Z'=H) (0.7 g., m.p. 126°–128°C.).

B. A mixture of 1-(α-chlorobenzylidene)-3-chloro-1H-isoindole (32.8 g.), β-(dimethylamino)ethylamine (21.1 g.) and ether (350 ml.) was stirred at room temperature (for 1.5 hr.) and filtered. Evaporation of the ether from the filtrate gave a viscous oil (40.1 g.), an ethereal solution of which was treated with hydrochloric acid. Two recrystallizations of the resulting solid (34.0 g., m.p. 159°–160°C.) from isopropyl alcohol afforded 1-(α-chlorobenzylidene)-3-{[2-(dimethylamino)ethyl]amino}-1H-isoindole (I: X+X'=CCl$C_6H_5$, Y=NQQ', Q=$CH_2CH_2N(CH_3)_2$, Q=Z=Z'=H) dihydrochloride (12.0 g., m.p. 272°–273°C. with decomposition).

EXAMPLE 11

By substituting thionyl bromide for thionyl chloride in Step A of Example 10 and carrying the resulting 1-(α-bromobenzylidene)-3-bromo-1H-isoindole through STep B, 1-(α-bromobenzylidene)-3-{[2-(dimethylamino)ethyl]amino}-1H-isoindole (I: X+X'=$C_6H_5$, Y=NQQ', Q=$CH_2CH_2N(CH_3)_2$, Q=Z=Z'=H) dihydrochloride is obtained.

EXAMPLE 12

A mixture of 1-benzylidene-3-ethoxy-1H-isoindole (20.0 g.) and piperidine (40 ml.) was heated under reflux (for 14 hr.). The resulting mixture was digested with methanol and filtered. Recrystallization of the solid (18.3 g., m.p. 145°–147°C.) from Skellysolve B afforded 1-benzylidene-3-piperi-dino-1H-isoindole (I: X+X'=$C_6H_5$,

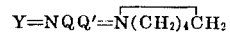
Y=NQQ'=$\overline{N(CH_2)_4CH_2}$

Z=Z'=H) (16.5 g., m.p. 145°–147°C.).

EXAMPLE 13

A mixture of 1-(p-chlorobenzylidene)-3-ethoxy-1H-isoindole (III: X''+X'=CH$C_6H_4$Cl-p, Q'''=$C_2H_5$, Z=Z'=H) (22.6 g., m.p. 102°–103°C.) and piperidine (40 ml.) was heated under reflux overnight. The solid was washed with ether and dried, affording 1-(p-chlorobenzylidene)-3-piperidino-1H-isoindole (I: X+X'=$C_6H_4$Cl-p,

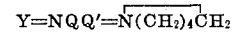
Y=NQQ'=$\overline{N(CH_2)_4CH_2}$

Z=Z'=H) (22.0 g., m.p. 174°–175°C.).

EXAMPLE 14

Condensation of 1-(p-hydroxybenzylidene)-3-ethoxy-1H-isoindole (III: X''+X'=CH$C_6H_4$OH-p, Q'''=$C_2H_5$, Z=Z'=H) and piperidine affords 1-(p-hydroxybenzylidene)-3-piperidino-1H-isoindole (I: X+X'=CH$C_6H_4$OH-p,

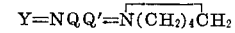
Y=NQQ'=$\overline{N(CH_2)_4CH_2}$

Z=Z'=H).

EXAMPLE 15

Condensation of 1-(m-methylbenzylidine)-3-ethoxy-1H-isoindole (III: X''+X'=CHC$_6$H$_4$CH$_3$-m, Q'''=C$_2$H$_5$, Z=Z'=H) and piperidine affords 1-(m-methylbenzylidene)-3-piperidino-1H-isoindole (I: X+X'=CHC$_6$H$_4$CH$_3$-m,

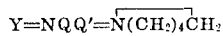

Z=Z'=H).

EXAMPLE 16

A mixture of 1-(p-methoxybenzylidene)-3-ethoxy-1H-isoindole (III: X''+X'=CHC$_6$H$_4$OCH$_3$-p, Q'''=C$_2$H$_5$, Z=Z'=H) (18.0 g., m.p. 93°–95°C.) and piperidine (30 ml.) was heated under reflux (for 5 hr.). The resulting solid (15.0 g., m.p. 147°–149°C., 2.0 g., m.p. 147°–151°C.) was combined with the corresponding solid (14.0 g., m.p. 148°–150°C.) from another run and recrystallized from isopropyl alcohol, affording 1-(p-methoxybenzyl-idene)-3-piperidino-1H-isoindole (I: X+X'=CHC$_6$H$_4$OCH$_3$-p,

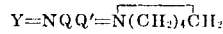

Z=Z'=H) (25.3 g., m.p. 152°–154°C.).

EXAMPLE 17

Condensation of 1-(3,4,5-trimethoxybenzylidene)-3-ethoxy-1H-isoindole (III: X''+X'=CHC$_6$H$_2$(OCH$_3$)$_3$-3,4,5, Q'''=C$_2$H$_5$, Z=Z'=H) and piperidine affords 1-(3,4,5,-trimethoxybenzyl-idene)-3-piperidino-1H-isoindole (I: X+X'=CHC$_6$H$_2$(OCH$_3$)$_3$-3,4,5,

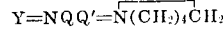

Z=Z'=H).

EXAMPLE 18

In a manner similar to that of Example 12, condensation of 1-[p-(benzyloxy)benzylidene]-3-ethoxy-1H-isoindole (III: X''+X'=CHC$_6$H$_4$OCH$_2$C$_6$H$_5$-p, Q'''=C$_2$H$_5$, Z=Z'=H) (40 g., m.p. 112°–114°C.) and piperidine (100 ml.) and recrystallization of part (27 g.) of the product (36.4 g., m.p. 140°–141°C., 4.0 g., m.p. 136°–137°C.) from ethanol afforded 1-[p-(benzyloxy)-benzylidene]-3-piperidino-1H-isoindole (I: X+X'=CHC$_6$H$_4$OCH$_2$C$_6$H$_5$-p,

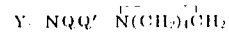

Z=Z'=H) (26.8 g., m.p. 141°–142°C.).

EXAMPLE 19

Condensation of 1-[p-(methylthio)benzylidene]-3-ethoxy-1H-isoindole (III: X''+X'=CHC$_6$H$_4$SCH$_3$-p, Q'''=C$_2$H$_5$, Z=Z'=H) and piperidine affords 1-[p-(methylthio)benzylidene]-3-piperidino-1H-isoindole (I: X+X'=CHC$_6$H$_4$SCH$_3$-p,

Z=Z'=H).

EXAMPLE 20

Condensation of 1-[p-(dimethylamino)benzylidene]-c-ETHOXY-aH-isoindole (III: X''+X'=CHC$_6$H$_4$N(CH$_3$)$_2$-p, Q'''=C$_2$H$_5$, Z=Z'=H) and piperidine affords 1-[p-(dimethylamino)benzylidene]3-piperidino-1H-isoindole (I: X+X'=CHC$_6$H$_4$N(CH$_3$)$_2$-p,

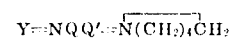

Z=Z'=H).

EXAMPLE 21

Condensation of 1-{p-[2-(diethylamino)ethoxy]benzyl-idene}-3-ethoxy-1H-isoindole (III: X''+X'=CHC$_6$H$_B$ and piperidine affords 1-{p-[2-(diethylamino)-ethoxy]benzylidene}-3-piperidino-1H-isoindole (I: X+X'=CHC$_6$H$_4$-OCH$_2$CH$_2$N(C$_2$H$_5$)$_2$-p,

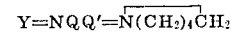

Z=Z'=H).

EXAMPLE 22

Condensation of 1-(p-nitrobenzylidene)-3-ethoxy-1H-isoindole (III: X''+X'=CHC$_6$H$_4$NO$_2$-p, Q'''=C$_2$H$_5$, Z=Z'=H) and piperidine affords 1-(p-nitrobenzylidene)-3-piperidino-1H-isoindole (I: X+X'=CHC$_6$H$_4$NO$_2$-p,

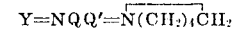

Z=Z'=H).

EXAMPLE 23

Condensation of 1-(p-sulfamoylbenzylidene)-3-ethoxy-1H-isoindole (III: X''+X'=CHC$_6$H$_4$SO$_2$NH$_2$-p, Q'''=C$_2$H$_5$, Z=Z'=H) and piperidine affords 1-(p-sulfamoylbenzylidene)-3-piperidino-1H-isoindole (I: X+X'=$_6$H$_4$SO$_2$NH$_2$-p,

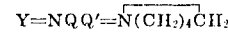

Z=Z'=H).

EXAMPLE 24

A mixture of 1-(α-chlorobenzylidene)-3-chloro-1H-isoindole (22 g.), piperidine (13.6 g.) and ether (400 ml.) was stirred at room temperature (for 3 hr.). The mixture was filtered. The filtrate was dried and concentrated. Crystallization of the residue from Skellysolve A gave 1-(α-chloro-benzylidene)-3-piperidino-1H-isoindole (I: X+X'=CClC$_6$H$_5$,

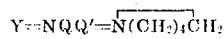

Z=Z'=H) (17.6 g., m.p. 62°–63°C.).

EXAMPLE 25

A mixture of 1-benzylidene-3-ethoxy-1H-isoindole (50 g.), ammonium chloride (20 g.) and methanol (1000 ml.) was heated under reflux (for 2.5 da.). Evaporation of the methanol and recrystallization of the residue, first from ethanol and then from isopropyl alcohol, gave 1-benzylidene-3-amino-1H-isoindole (I: X+X'=C$_6$H$_5$, Y=NQQ', Q=Q'=Z=Z'=H) hydrochloride (12.0 g., m.p. 256°–257°C. with decomposition).

EXAMPLE 26

Condensation of 1-benzylidene-3-ethoxy-1H-isoindole and methylammonium chloride affords 1-benzylidene-3-(methyl-amino)-1H-isoindole (I: X+X'=CHC$_6$H$_5$, Y=NQQ', Q=CH$_3$, Q'=Z=Z'=H) hydrochloride.

EXAMPLE 27

Condensation of 1-benzylidene-3-ethoxy-1H-isoindole and isopropylammonium chloride affords 1-benzylidene-3-(iso-propylamino)-1H-isoindole (I: X+X'=C$_6$H$_5$, Y=NQQ', Q=CH(CH$_3$)$_2$, Q'=Z=Z'=H) hydrochloride.

EXAMPLE 28

Condensation of 1-benzylidene-3-ethoxy-1H-isoindole and pentylammonium chloride affords 1-benzylidene-3-(pentyl-amino)-1H-isoindole (I: X+X'=CHC$_6$H$_5$, Y=NQQ', Q=(CH$_2$)$_4$CH$_3$, Q'=Z=Z'=H) hydrochloride.

EXAMPLE 29

A mixture of 3-ethoxy-1H-isoindole (16 g.) and benzylamine (15 g.) was heated (130°–135°C. for 1½ hr.). The excess benzylamine was distilled under vacuum. Recrystallization of the crystalline residue from Skellysolve B gave 3-(benzylamino)-1H-isoindole (I: X=X'=Z=Z'=H, Y=NQQ', Q=CH$_2$C$_6$H$_5$, Q'=H) (11.0 g., m.p. 104°–105°C.).

EXAMPLE 30

Condensation of 3-ethoxy-1H-isoindole and 3-phenyl-propylamine affords 3-(3-phenylpropylamino)-1H-isoindole (I: X=X'=Z=Z'=H, Y=NQQ', Q=(CH$_2$)$_3$C$_6$H$_5$, Q'=H).

EXAMPLE 31

Condensation of 3-ethoxy-1H-isoindole and p-chloro-benzylamine affords 3-(p-chlorobenzylamino)-1H-isoindole (I: X=X'=Z=Z'=H, Y=NQQ', Q=CH$_2$C$_6$H$_4$Cl-p, Q'=H).

EXAMPLE 32

Condensation of 3-ethoxy-1H-isoindole and p-hydroxy-benzylamine affords 3-(p-hydroxybenzylamino)-1H-isoindole (I: X=X'=Z=Z'=H, Y=NQQ', Q=CH$_2$C$_6$H$_4$OH-p, Q'=H).

EXAMPLE 33

Condensation of 3-ethoxy-1H-isoindole and p-methoxy-benzylamine affords 3-(p-methoxybenzylamino)-1H-isoindole (I: X=X'=Z=Z'=H, Y=NQQ', Q=CH$_2$C$_6$H$_4$OCH$_3$-p, Q'=H).

EXAMPLE 34

A mixture of 3-ethoxy-1H-isoindole (9.0 g.), 3,4,5-trimethoxybenzylamine hydrochloride (13.0 g.) and methanol (150 ml.) was heated under reflux (for 5 hr.) under nitrogen. The mixture was stripped of solvent. Recrystallization of the residue (14.3 g., m.p. 227°–228 °C.) from isopropyl alcohol gave 3-[(3,4,5-trimethoxybenzyl)amino]-1H-isoindole (I: X=X'=Z=Z'=H, Y=NQQ', Q=CH$_2$C$_6$H$_2$(OCH$_3$)$_3$-3,4,5, Q'=H) hydrochloride (8.1 g., m.p. 227°–228°C.).

EXAMPLE 35

Condensation of 3-ethoxy-1H-isoindole and p-(benzyloxy)benzylamine hydrochloride affords 3-[p-(benzyloxy)benzyl-amino]-1H-isoindole (I: X=X'=Z=Z'=NQQ', Q=CH$_2$C$_6$H$_4$OCH$_2$C$_6$H$_5$-p, Q'=H) hydrochloride.

EXAMPLE 36

Condensation of 3-ethoxy-1H-isoindole and p-(methyl-thio)benzylamine hydrochloride affords 3-[p-(methylthio)benzyl-amino]-1H-isoindole (I: X=X'=Z=Z'=NQQ', Q=CH$_2$C$_6$H$_4$SCH$_3$-p, Q'=H) hydrochloride.

EXAMPLE 37

Condensation of 3-ethoxy-1H-isoindole and p-(dimethyl-amino)benzylamine hydrochloride affords 3-[p-(dimethylamino)-benzyl]-1H-isoindole (I: X=X'=Z=Z'=NQQ', Q'=CH$_2$C$_6$H$_4$N(CH$_3$)$_2$-p, Q'=H) hydrochloride.

EXAMPLE 38

A mixture of 3-ethoxy-1H-isoindole (8.0 g.) and p-[2-(diethylamino)ethoxy]benzylamine (22.4 g.) was heated (80°C. for 2 hr.). The excess amine was distilled under vacuum. A Skellysolve B solution of the residue was treated with charcoal, dried and filtered. Ethereal hydrochloric acid was added to the filtrate. The solid was digested with, then recrystallized from, isopropyl alcohol, affording 3-{p-[2-(diethylamino)ethoxy]benzylamino}-1H-isoindole (I: X=X'=Z=Z'=H, Y=NQQ', Q=CH$_2$C$_6$H$_4$OCH$_2$CH$_2$N(C$_2$H$_5$)$_2$-p, Q'=H)dihydrochloride hydrate (11.0 g., m.p. 250°–252°C.).

EXAMPLE 39

Condensation of 3-ethoxy-1H-isoindole and p-nitrobenzyl-amine affords 3-(p-nitrobenzylamino)-1H-isoindole (I: X=X'=Z=Z'=H, Y=NQQ', Q=CH$_2$C$_6$H$_4$NO$_2$-p, Q'=H).

EXAMPLE 40

Condensation of 3-ethoxy-1H-isoindole and p-sulfamoyl-benzylamine affords 3-(p-sulfamoyl-benzylamino)-1H-isoindole (I: X=X'=Z=Z'=H, Y=NQQ', Q=CH$_2$C$_6$H$_4$SO$_2$NH$_2$-p, Q'=H).

EXAMPLE 41

In a manner similar to that of Example 9, condensation of 1-benzylidene-3-ethoxy-1H-isoindole (24.9 g.) and β-(diethylamino)ethylamine (30 ml.) and treatment of the resulting product with hydrochloric acid afforded 1-benzylidene-3-{[2-(diethylamino)ethyl]amino}-1H-isoindole (I: X+X'=CHC$_6$H$_5$, Y=NQQ', Q=CH$_2$CH$_2$N(C$_2$H$_5$)$_2$, Q'=Z=Z'=H) dihydrochloride (18.1 g., m.p. 202°–204°C. with decomposition).

EXAMPLE 42

Acylation of 1-benzylidene-3-amino-1H-isoindole hydrochloride with a mixture of acetic anhydride and pyridine gives 1-benzylidene-3-acetamido-1H-isoindole (I: X+X'=CHC$_6$H$_5$, Y=NQQ', Q=COCH$_3$, Q'=Z=Z'=H).

EXAMPLE 43

Acylation of 1-benzylidene-3-amino-1H-isoindole hydrochloride with a mixture of isobutyryl chloride and pyridine gives 1-benzylidene-3-(isobutyrylamino)-1H-isoindole (I: X+X'=CHC$_6$H$_5$, Y=NQQ', Q=COCH(CH$_3$)DI2, Q'=Z=Z'=H).

EXAMPLE 44

Acylation of 1-benzylidene-3-amino-1H-isoindole hydrochloride with a mixture of benzoyl bromide and pyridine gives 1-benzylidene-3-benzamido-1H-isoindole (I: X+X'=CHC$_6$H$_5$, Y=NQQ', Q=COC$_6$H$_5$, Q'=Z=Z'=H).

EXAMPLE 45

A mixture of 1-benzylidene-3-amino-1H-isoindole hydrochloride (20.2 g.), p-chlorobenzoyl chloride (13.6 g.), triethylamine (17.5 g.) and dry chloroform (200 ml.) was stirred at room temperature (for 7 hr.) and filtered. The filtrate was evaporated under vacuum and the residue was extracted with benzene (2 ×400 ml.). Evaporation of the benzene gave a solid (27 g., m.p. 174°–175°C.), which was recrystallized from Skelly-solve C, affording 1-benzylidene-3-(p-chlorobenzamido)-1H-isoindole (I: X+X'=CHC$_6$H$_5$, Y=NQQ', Q=COC$_6$H$_4$Cl-p, Q'=Z=Z'=H) (18.0 g., m.p. 171°–172°C.).

EXAMPLE 46

Acylation of 1-benzylidene-3-amino-1H-isoindole hydrochloride with p-hydroxybenzoyl chloride gives 1-benzylidene-3-(p-hydroxybenzamido)-1H-isoindole (I: X+X'=$_6$H$_5$, Y=NQQ', Q=COC$_6$H$_4$OH-p, Q'=Z=Z'=H).

EXAMPLE 47

Acylation of 1-benzylidene-3-amino-1H-isoindole hydrochloride with p-methoxybenzoyl chloride gives 1-benzylidene-3-(p-methoxybenzamido)-1H-isoindole (I: X+X'=CHC$_6$H$_5$, Y=NQQ', Q=COC$_6$H$_4$OCH$_3$-p, Q'=Z=Z'=H).

EXAMPLE 48

Acylation of 1-benzylidene-3-amino-1H-isoindole hydrochloride with 3,4,5-trimethoxybenzoyl chloride gives 1-benzylidene-3-(3,4,5-trimethoxybenzamido)-1H-isoindole (I: X+X'=CHC$_6$H$_5$, Y=NQQ', Q=COC$_6$H$_2$(OCH$_3$)$_3$-3,4,5, Q'=Z=Z'=H).

EXAMPLE 49

Acylation of 1-benzylidene-3-amino-1H-isoindole hydrochloride with p-(benzyloxy)benzoyl chloride gives 1-benzylidene-3-[p-(benzyloxy)benzamido]-1H-isoindole (I: X+X'=CHC$_6$H$_5$, Y=NQQ', Q=COC$_6$H$_4$OCH$_2$C$_6$H$_4$OCH$_5$–P(Q'=Z=Z'=H).

EXAMPLE 50

Acylation of 1-benzylidene-3-amino-1H-isoindole with p-(methylthio)benzoyl chloride gives 1-benzylidene-3-[p-(methylthio)benzamido]-1H-isoindole (I: X+X'=$_6$H$_5$, Y=NQQ', Q=COC$_6$H$_4$SCH$_3$-p, Q'=Z=Z'=H).

EXAMPLE 51

Acylation of 1-benzylidene-3-amino-1H-isoindole with p-(dimethylamino)benzoyl chloride gives 1-benzylidene-3-[p-(dimethylamino)benzamido]-1H-isoindole (I: X+X'=CHC$_6$H$_5$, Y=NQQ', Q=COC$_6$H$_4$N(CH$_3$)$_2$-p, Q'=Z=Z'=H).

EXAMPLE 52

Acylation of 1-benzylidene-3-amino-1H-isoindole with p-[2-(diethylamino)ethoxy]benzoyl chloride gives 1-benzylidene-3-{p-[2-(diethylamino)ethoxy]benzamido}-1H-isoindole (I: X+X'=CHC$_6$H$_5$, Y=NQQ', Q=COC$_6$H$_4$OCH$_2$CH$_2$N(C$_2$H$_5$)$_2$-p, Q'=Z=Z'=H).

EXAMPLE 53

Acylation of 1-benzylidene-3-amino-1H-isoindole with p-nitrobenzoyl chloride gives 1-benzylidene-3-(p-nitrobenzamido)-1H-isoindole (I: X+X'=CHC$_6$H$_5$, Y=NQQ', Q=COC$_6$H$_4$NO$_2$-p, Q'=Z=Z'=H).

EXAMPLE 54

Acylation of 1-benzylidene-3-amino-1H-isoindole with p-sulfamoylbenzoyl chloride gives 1-benzylidene-3-(p-sulfamoylbenzamido)-1H-isoindole (I: X+X'=CHC$_6$H$_5$, Y=NQQ', Q=COC$_6$H$_4$-SO$_2$NH$_2$-p, Q'=Z=Z'=H).

EXAMPLE 55

Acylation of 1-benzylidene-3-amino-1H-isoindole with β-phenylpropionyl chloride gives 1-benzylidene-3-(β-phenylpropionamide)-1H-isoindole (I: X+X'=CHC$_6$H$_5$, Y=NQQ', Q=COCH$_2$CH$_2$C$_6$H$_5$, Q'=Z=Z'=H).

EXAMPLE 56

Condensation of 1-benzylidene-3-ethoxy-1H-isoindole and dimethylammonium chloride afford 1-benzylidene-3-(dimethylamino)-1H-isoindole (I: X+X'=H, Y=NQQ', Q=Q'=CH₃, Z=Z'=H) hydrochloride.

EXAMPLE 57

Condensation of 1-benzylidene-3-ethoxy-1H-isoindole and dibutylammonium chloride affords 1-benzylidene-3-(dibutyl-amino)-1H-isoindole (I: X+X'=CHC₆H₅, Y=NQQ', Q=Q'=(CH₂)₃CH₃, Z=Z'=H) hydrochloride.

EXAMPLE 58

A mixture of 1-benzylidene-3-ethoxy-1H-isoindole (24.9 g.) and pyrrolidine (40 ml.) was heated at reflux overnight. The resulting solid was washed with ether, affording 1-benzylidene-3-(1-pyrrolidinyl)-1H-isoindole (I: X+X'=CHC₆H₅, Y=NQQ',

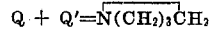

Z=Z'=H) (19.7 g., m.p. 212°–213°C.).

EXAMPLE 59

A mixture of 3-ethoxy-1H-isoindole (22.1 g.), hydrazine (97 percent, 17.8 g.) and absolute ethanol (160 ml.) was heated under reflux (for 2.5 hr.). The mixture was stripped of ethanol and excess hydrazine and the residue was triturated with Skellysolve A. The resulting solid (17.5 g., m.p. 139°–141°C.) was recrystallized from acetonitrile, affording 3-hydrazino-1H-isoindole (I: X=X'=Z=Z'=H, Y=NQQ', Q=NH₂, Q'=H) (13.0 g., m.p. 145°–146°C. with decomposition).

EXAMPLE 60

Condensation of 1-methyl-3-ethoxy-1H-isoindole and hydrazine affords 1-methyl-3-hydrazino-1H-isoindole (I: X=CH₃, X'=Z=Z'=H, Y=NQQ', Q=NH₂, Q'=H).

EXAMPLE 61

Condensation of 1-butyl-3-ethoxy-1H-isoindole and hydrazine affords 1-butyl-3-hydrazino-1H-isoindole (I: X=(CH₂)₃CH₃, X'=Z=Z'=H, Y=NQQ', Q=NH₂, Q'=H).

EXAMPLE 62

Condensation of 1-phenyl-3-ethoxy-1H-isoindole and hydrazine affords 1-phenyl-3-hydrazino-1H-isoindole (I: X=C₆H₅, X'=Z=Z'=H, Y=NQQ', Q=NH₂, Q'=H).

EXAMPLE 63

Condensation of 1-benzyl-3-ethoxy-1H-isoindole and hydrazine affords 1-benzyl-3-hydrazino-1H-isoindole (I: X=C₆H₅CH₂, X'=Z=Z'=H, Y=NQQ', Q=NH₂, Q'=H).

EXAMPLE 64

Condensation of 3-ethoxy-6-methyl-1H-isoindole (III: X''=X'=Z=H, Q'''=C₂H₅, Z'=CH₃) and hydrazine affords 3-hydrazino-6-methyl-1H-isoindole (I: X=X'=Z=H, Y=NQQ', Q=NH₂, Q'=H, Z'=CH₃).

EXAMPLE 65

Condensation of 3-ethoxy-5-chloro-1H-isoindole (III: X''=X'=Z'=H, Q'''=C₂H₅, Z=Cl) and hydrazine affords 3-hydrazino-5-chloro-1H-isoindole (I: X=X'=Z'=H, Y=NQQ', Q=NH₂, Q'=H, Z=Cl).

EXAMPLE 66

Condensation of 3-ethoxy-5-hydroxy-1H-isoindole (III: X''=X'=Z'=H, Q'''=C₂H₅, Z=HO) and hydrazine affords 3-hydrazino-5-hydroxy-1H-isoindole (I: X=X'=Z'=H, Y=NQQ', Q=NH₂, Q'=H, Z=HO).

EXAMPLE 67

Condensation of 3-ethoxy-5-methoxy-1H-isoindole (III: X''=X'=Z'=H, Q'''=C₂H₅, Z=CH₃O) and hydrazine affords 3-hydrazino-5-methoxy-1H-isoindole (I: X=X'=Z'=H, Y=NQQ', Q=NH₂, Q'=H, Z=CH₃O).

EXAMPLE 68

Condensation of 3-ethoxy-5,6-dimethoxy-1H-isoindole (III: X''=X'=H, Q'''=C₂H₅, Z=Z'=CH₃O) and hydrazine affords 3-hydrazino-5,6-dimethoxy-1H-isoindole (I: X=X'=H, Y=NQQ', Q=NH₂, Q'=H, Z=Z'=CH₃O).

EXAMPLE 69

Condensation of 3-ethoxy-5,6-methylenedioxy-1H-isoindole (III: X''=X'=H, Q'''=C₂H₅, Z+Z'=OCH₂O) and hydrazine affords 3-hydrazino-5,6-methylenedioxy-1H-isoindole (I: X=X'=H, Y=NQQ', Q=NH₂, Q'=H, Z+Z'=₂O).

EXAMPLE 70

In a manner similar to that of Example 59, condensation of 1-benzylidene-3-ethoxy-1H-isoindole (24.9 g.) and hydrazine (95 percent, 14.2 g.) gave a solid (18.7 g., m.p. 117°–120°C.), which was recrystallized from benzene, affording 1-benzylidene-3-hydrazino-1H-isoindole (I: X+X'=CHC₆H₅, Y=NQQ', Q=NH₂, Q'=Z=Z'=H) (9.0 g., m.p. 175°–176°C.).

EXAMPLE 71

Condensation of 3-ethoxy-1H-isoindole and hydroxylamine hydrochloride affords 3-hydroxylamino-1H-isoindole (I: X=X'=Z=Z'=H, Y=NQQ', Q=OH, Q'=H) hydrochloride.

EXAMPLE 72

Condensation of 3-hydrazino-1H-isoindole and formaldehyde affords 3-(2-methylenehydrazino)-1H-isoindole (I: X=X'=Z=Z'=H, Y=NHN=CRR', R=R'=H).

EXAMPLE 73

Condensation of 3-hydrazino-1H-isoindole and acetaldehyde affords 3-(2-ethylidenehydrazino)-1H-isoindole (I: X=X'=Z=Z'=H, Y=NHN=CRR', R=CH₃, R'=H).

EXAMPLE 74

Condensation of 3-hydrazino-1H-isoindole and isobutyraldehyde affords 3-(2-isobutylidenehydrazino)-1H-isoindole (I: X=X'=Z=Z'=H, Y=NHN=CRR', R=CH(CH₃)₂, R'=H).

EXAMPLE 75

Condensation of 3-hydrazino-1H-isoindole and pivaldehyde affords 3-[2-(tert-butylmethylene)hydrazino]-1H-isoindole (I: X=X'=Z=Z'=H, Y=NHN=CRR', R=C(CH₃)₃, R'=H).

EXAMPLE 76

Condensation of 3-hydrazino-1H-isoindole and tiglaldehyde affords 3-[2-(2,3-dimethylallylidene)hydrazino]-1H-isoindole (I: X=X'=Z=Z'=H, Y=NHN=CRR', R=C(CH₃)=CHCH₃, R'=H).

EXAMPLE 77

Condensation of 3-hydrazino-1H-isoindole and cyclopentanecarboxaldehyde affords 3-[2-(cyclopentylmethylene)-hydrazino]-1H-isoindole (I: X=X'=Z=Z'=NHN=CRR',

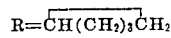

R'=H).

EXAMPLE 78

Condensation of 3-hydrazino-1H-isoindole and 3-cyclohexenecarboxaldehyde affords 3-[2-(cyclohexenylmethylene)hydrazino]-1H-isoindole (I: X=X'=Z=Z'=NHN=CRR',

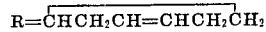

R'=H).

EXAMPLE 79

Condensation of 3-hydrazino-1H-isoindole and benzaldehyde affords 3-(2-benzylidenehydrazino)-1H-isoindole (I: X=X'=Z=Z'=H, Y=NHN=CRR', R=C₆H₅, R'=H).

EXAMPLE 80

Condensation of 3-hydrazino-1H-isoindole and α-phenylpropionaldehyde affords 3-[2-(2-phenylpropenylidene)hydrazino]-1H-isoindole (I: X=X'=Z=Z'=NHN=CRR', R=CH(CH₃)C₆H₅, R'=H).

EXAMPLE 81

Condensation of 3-hydrazino-1H-isoindole and α-methyl-cinnamaldehyde affords 3-[2-(2-methyl-3-phenylallylidene)hydrazino]1H-isoindole (I: X=X'=Z=Z'=NHN=CRR', R=C(CH₃)=CHC₆H₅, R'=H).

EXAMPLE 82

Condensation of 3-hydrazino-1H-isoindole and p-bromobenzaldehyde affords 3-[2-(p-bromobenzylidene)hydrazino]-1H-isoindole (I: X=X'=Z=Z'=H, Y=NHN=CRR', R=C₆H₄Br-p, R'=H).

EXAMPLE 83

Condensation of 3-hydrazino-1H-isoindole and m-hydroxybenzaldehyde affords 3-[2-(m-hydroxybenzylidene)hydrazino]-1H-isoindole (I: X=X'=Z=Z'=H, Y=NHN=CRR', R=C₆H₄OH-m, R'=H).

EXAMPLE 84

Condensation of 3-hydrazino-1H-isoindole and p-tolualdehyde affords 3-[2-(p-methylbenzylidene)hydrazino]-1H-isoindole (I: X=X'=Z=Z'=H, Y=NHN=CRR', R=C₆H₄CH₃-p, R'=H).

EXAMPLE 85

Condensation of 3-hydrazino-1H-isoindole and syringaldehyde affords 3-[2-(3,5-dimethoxy-4-hydroxybenzylidene)hydrazino]-1H-isoindole (I: X=X'=Z=Z'=NHN=CRR', R=C₆H₂OH-4-(OCH₃)₂-3,5, R'=H).

EXAMPLE 86

Condensation of 3-hydrazino-1H-isoindole and p-(ethylthio)benzaldehyde affords 3-{2-[p-(ethylthio)benzylidene]hydrazino}-1H-isoindole (I: X=X'=Z=Z'=H, Y=NHN=CRR', R=C₆H₄SC₂H₅-p, R'=H).

EXAMPLE 87

Condensation of 3-hydrazino-1H-isoindole and p-(dimethylamino)benzaldehyde affords 3-{2-[p-(dimethylamino)benzylidene]hydrazine} - 1H - isoindole (I: X=X'=Z=Z'=H, Y=NHN=CRR', R=C₆H₄N(CH₃)₂-p, R'=H).

EXAMPLE 88

Condensation of 3-hydrazino-1H-isoindole and p-[2-(diethylamino) ethoxy]benzaldehyde affords 3-(2-{p-[2-(diethyl-amino)ethoxy]benzylidene}hydrazino)-1H-isoindole (I: X=X'=Z=Z'=H, Y=NHN=CRR', R=C₆H₄$^{OCH}$₂CH₂N(C₂H₅)₂-p, R'=H).

EXAMPLE 89

Condensation of 3-hydrazino-1H-isoindole and p-nitrobenzaldehyde affords 3-[2-(p-nitrobenzylidene)hydrazino]-1H-isoindole I: X=X'=Z=Z'=H, Y=NHN=CRR', R=C₆H₄NO₂-p, R'=H).

EXAMPLE 90

Condensation of 3-hydrazino-1H-isoindole and p-sulfamoylbenzaldehyde affords 3-[2-(p-sulfamoylbenzylidene)-hydrazino]-1H-isoindole (I: X=X'=Z=Z'=NHN=CRR', R=C₆H₄SO₂NH₂p, R'=H).

EXAMPLE 91

A mixture of 3-hydrazino-1H-isoindole (15 g.), acetone (530 ml.) and sulfuric acid (10 g.) was stirred (for 1 hr. at 15°C.). The resulting solid was collected by filtration, washed with ether and dried, affording 3-(2-isopropylidenehydrazino)-1H-isoindole (I: X=X'=Z=Z'=NHN=CRR', R=R'=CH₃) sulfate (19.5 g., m.p. 138°–140°C.).

EXAMPLE 92

Condensation of 3-hydrazino-1H-isoindole and methyl isopropyl ketone affords 3-[2-(1,2-dimethylpropylidene)hydrazino]-1H-isoindole (I: X=X'= Z=Z'=H, Y=NHN=CRR', R=CH₃, R'=CH(CH₃)₂).

EXAMPLE 93

Condensation of 3-hydrazino-1H-isoindole and cyclohexanone affords 3-(2-cycloxylidenehydrazino)-1 H-isoindole (I: X=X'=Z=Z'=H, Y=NHN=CRR', $R+R' = \overset{\frown}{C(CH_2)_4CH_2})$.

EXAMPLE 94

Condensation of 1-methyl-3-hydrazino-1H-isoindole and acetone affords 1-methyl-3-(2-isopropylidenehydrazino)-1H-isoindole (I: X=CH₃, X'=Z= Z'=H, Y=NHN=CRR', R=R'=CH₃).

EXAMPLE 95

Condensation of 1-butyl-3-hydrazino-1H-isoindole and acetone affords 1-butyl-3-(2-isopropylidenehydrazino)-1H-isoindole (I: X=(CH₂)₃CH₃, X'=Z=Z'=H, Y=NHN=CRR', R=R'=CH₃).

EXAMPLE 96

Condensation of 1-phenyl-3-hydrazino-1H-isoindole and acetone affords 1-phenyl-3-(2-isopropylidenehydrazino)-1H-isoindole (I: X=C₆H₅, X'=Z= Z'=H, Y=NHN=CRR', R=R'=CH₃).

EXAMPLE 97

Condensation of 1-benzyl-3-hydrazino-1H-isoindole and acetone affords 1-benzyl-3-(2-isopropylidenehydrazino)-1H-isoindole (I: X=C₆H₅CH₂, X'=Z= Z'=H, Y=NHN=CRR', R=R'=CH₃).

EXAMPLE 98

Condensation of 3-hydrazino-6-methyl-1H-isoindole and acetone affords 3-(2-isopropylidenehydrazino)-5-methyl-1H-isoindole (I: X=X'=Z'=H, Y=NHN=CRR', R=R'=Z=CH₃).

EXAMPLE 99

Condensation of 3-hydrazino-5-chloro-1H-isoindole and acetone affords 3-(2-isopropylidenehydrazino)-6-chloro-1H-isoindole (I: X=X'=Z=H, Y=NHN=CRR', R=R'=CH₃, Z'=Cl).

EXAMPLE 100

Condensation of 3-hydrazino-5-hydroxy-1H-isoindole and acetone affords 3-(2-isopropylidenehydrazino)-6-hydroxy-1H-isoindole (I: X=X'= Z=H, Y=NHN=CRR', R=R'=CH₃, Z'=HO).

EXAMPLE 101

Condensation of 3-hydrazino-5-methoxy-1H-isoindole and acetone affords 3-(2-isopropylidenehydrazino)-6-methoxy-1H-isoindole (I: X=X'= Z=H, Y=NHN=CRR', R=R'=CH₃, Z'=CH₃O).

EXAMPLE 102

Condensation of 3-hydrazino-5,6-dimethoxy-1H-isoindole and acetone affords 3-(2-isopropylidenehydrazino)-5,6-dimethoxy-1H-isoindole (I: X=X'=H, Y=NHN=CRR', R=R'=CH₃, Z=Z'=CH₃O).

EXAMPLE 103

Condensation of 3-hydrazino-5,6-methylenedioxy-1 H-isoindole and acetone affords 3-(2-isopropylidenehydrazino)-5,6-methylenedioxy-1H-isoindole (I: X=X'=H, Y=NHN=CRR', R=R'=CH₃, Z+Z'= OCH₂O).

I claim:

1. 1-(X)-1-(X')-3-(Y)-5-(Z)-6-(Z')-1H-Isoindole of the formula

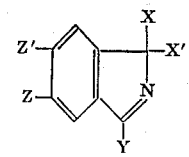

wherein
X and X', when taken together, are benzylidene, α-chlorobenzylidene or α-bromobenzylidene;
Y is NQQ' or NHN=CRR';
wherein
Q, when taken alone, is hydrogen; alkyl of one to six carbon atoms; phenylalkyl of seven to ten carbon atoms; (CH₂)ₙ-T, wherein n is two or three and T is dialkylamino, wherein alkyl of dialkylamino is a tertiary alkyl of one to four carbon atoms; alkanoyl of one to six carbon atoms; benzoyl; phenylalkanoyl of eight to eleven carbon atoms; amino or hydroxy;
Q', when taken alone, is hydrogen or a tertiary alkyl of one to four carbon atoms;
Q and Q', when taken together with N, are 1-azacycloalkyl of five to seven ring atoms and four to ten carbon atoms;
R, when taken alone, is hydrogen, alkyl of one to six carbon atoms, alkenyl of two to six carbon atoms, cycloalkyl of three to seven ring atoms and three to ten carbon atoms, cycloalkenyl of five to seven ring atoms and five to ten carbon atoms, phenyl, phenylalkyl of seven to ten carbon atoms or phenylalkenyl of eight to ten carbon atoms;
R', when taken alone, is hydrogen or a tertiary alkyl of one to four carbon atoms;
R and R', when taken together with C, are cycloalkylidene of five to seven ring atoms and five to ten carbon atoms;
Z and Z', when taken alone are the same or different and are hydrogen, a tertiary alkyl of one to four carbon atoms, halo, hydroxy or a tertiary alkoxy of one to four carbon atoms;
Z and Z', when taken together, are methylenedioxy; and wherein,
when X and X' are benzylidene, α-chlorobenzylidene or α-bromo-benzylidene, Q is phenylalkyl of seven to ten carbon atoms or benzoyl and/or R is phenyl, the benzene ring thereof can be substituted by one to three members selected from the group consisting of halo, hydroxy, a tertiary alkyl of one to four carbon atoms, a tertiary alkoxy of one to four carbon atoms and phenylalkoxy of seven to ten carbon atoms or by a member selected from the group consisting of a tertiary alkylthio of one to four carbon atoms, dialkylamino and β-dialkylaminoethoxy, wherein alkyl of dialkylamino is a tertiary alkyl of one to four carbon atoms, nitro and sulfamoyl; and acid addition salts thereof.

2. 1-(X)-1-(X')-3-(Y)-5-(Z)-6-(Z')-1H-Isoindole wherein X and X', when taken together, are benzylidene and Y is NQQ', wherein Q is hydrogen according to claim 1.

3. 1-(X)-1-(X')-3-(Y)-5-(Z)-6-(Z')-1H-Isoindole wherein X and X', when taken together, are benzylidene and Y is NQQ', wherein Q is $(CH_2)_n$-T, wherein n is two or three and T is dialkylamino, wherein alkyl of dialkylamino is a tertiary alkyl of one to four carbon atoms, according to claim 1.

4. 1-(X)-1-(X')-3-(Y)-5-(Z)-6-(Z')-1H-Isoindole wherein X and X', when taken together, are benzylidene and Y is NQQ', wherein Q is benzoyl, according to claim 1.

5. 1-(X)-1-(X')-3-(Y)-5-(Z)-6-(Z')-1H-Isoindole wherein X and X', when taken together, are benzylidene and Y is NQQ', wherein Q is amino, according to claim 1.

6. 1-(X)-1-(X')-3-(Y)-5-(Z)-6-(Z')-1H-Isoindole wherein X and X', when taken together, are benzylidene and Y is NQQ', wherein Q and Q', when taken together with N, are 1-azacycloalkyl of five to seven ring atoms and four to ten carbon atoms, according to claim 1.

7. 1-(X)-1-(X')-3-(Y)-5-(Z)-6-(Z')-1H-Isoindole wherein X and X', when taken together, are α-chlorobenzylidene and Y is NQQ', wherein Q is $(CH_2)_n$-T, wherein n is two or three and T is dialkylamino, wherein alkyl of dialkylamino is a tertiary alkyl of one to four carbon atoms, according to claim 1.

8. 1-(X)-1-(X')-3-(Y)-5-(Z)-6-(Z')-1H-Isoindole wherein X and X', when taken together, are α-chlorobenzylidene and Y is NQQ', wherein Q and Q', when taken together with N, are 1-azacycloalkyl of five to seven ring atoms and four to ten carbon atoms, according to claim 1.

9. 1-Benzylidene-3-{[2-(dimethylamino)ethyl]amino}-1H-isoindole according to claim 3.

10. 1-Benzylidene-3-piperidino-1H-isoindole according to claim 3.

11. 1-(p-Chlorobenzylidene)-3-piperidino-1H-isoindole according to claim 6.

12. 1-(p-Methoxybenzylidene)-3-piperidino-1H-isoindole according to claim 6.

13. 1-[p-(Benzyloxy)benzylidene]-3-piperidino-1H-isoindole according to claim 6.

14. 1-Benzylidene-3-amino-1H-isoindole according to claim 2.

15. 1-Benzylidene-3-{[2-(diethylamino)ethyl]amino}-1H-isoindole according to claim 3.

16. 1-Benzylidene-3-(1-pyrrolidinyl)-1H-isoindole according to claim 6.

17. 1-Benzylidene-3-hydrazino-1H-isoindole according to claim 5.

18. 1-(α-Chlorobenzylidene)-3-{[2-(dimethylamino)ethyl]-amino}-1H-isoindole according to claim 7.

19. 1-(α-Chlorobenzylidene)-3-piperidino-1H-isoindole according to claim 8.

20. 1-Benzylidene-3-(p-chlorobenzamido)-1H-isoindole according to claim 4.

* * * * *

UNITED STATES PATENT OFFICE
CERTIFICATE OF CORRECTION

Patent No. 3,723,421              Dated March 27, 1973

Inventor(s) Guy D. Diana

It is certified that error appears in the above-identified patent and that said Letters Patent are hereby corrected as shown below:

Claim 10, "according to claim 3" should read --according to claim 6--.

Signed and sealed this 20th day of November 1973.

(SEAL)
Attest:

EDWARD M. FLETCHER, JR.         RENE D. TEGTMEYER
Attesting Officer                Acting Commissioner of Patents